United States Patent
Knuppel

[19]

[11] Patent Number: 6,125,576

[45] Date of Patent: Oct. 3, 2000

[54] MOUSE OR RODENT TRAP AND METHOD OF ASSEMBLING SAME

[75] Inventor: Harry E. Knuppel, Albia, Iowa

[73] Assignee: Kness Mfg. Co., Inc., Albia, Iowa

[21] Appl. No.: 09/307,133

[22] Filed: May 7, 1999

[51] Int. Cl.$^7$ ................................................ A01M 23/10
[52] U.S. Cl. ............................................................ 43/74
[58] Field of Search .................................. 43/74, 67, 69, 43/71

[56] References Cited

U.S. PATENT DOCUMENTS

| | | | |
|---|---|---|---|
| 1,067,909 | 7/1913 | Fisher | 43/74 |
| 1,214,060 | 1/1917 | Mutz | 43/74 |
| 1,758,952 | 5/1930 | Kness | 43/74 |
| 2,433,913 | 1/1948 | Kness . | |
| 2,594,182 | 4/1952 | Kness | 43/74 |
| 2,643,480 | 6/1953 | Jones | 43/74 |

*Primary Examiner*—Kurt Rowan
*Attorney, Agent, or Firm*—Zarley, McKee, Thomte, Voorhees & Sease

[57] ABSTRACT

A mouse or rodent trap includes a housing having an elongated rotatable paddle member therein. A trigger assembly engages the paddle member and releases the paddle member for rotation when the trigger assembly is engaged by a mouse or rodent entering the housing. The trigger assembly is formed completely of plastic, and is snapped together during assembly.

8 Claims, 3 Drawing Sheets

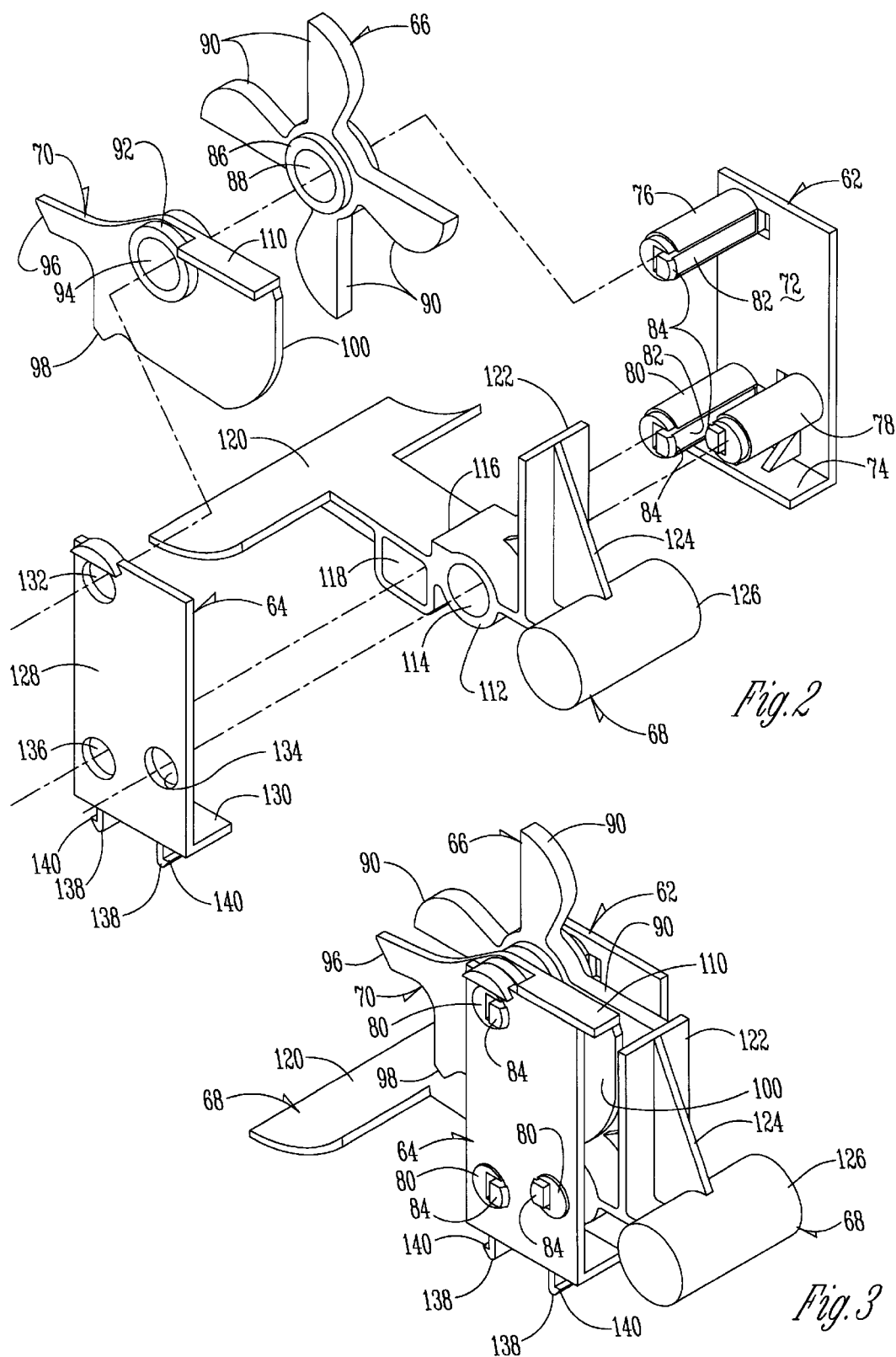

MOUSE OR RODENT TRAP AND METHOD OF ASSEMBLING SAME

BACKGROUND OF THE INVENTION

The present invention relates to a new and useful improvement in mouse or rodent traps of the type disclosed in previous letters patent 1,758,952 dated May 20, 1930 and 2,433,913 dated Jan. 6, 1948.

These prior art traps were generally constructed from metal parts. Consequently the intricate mechanisms within these prior art traps were difficult to manufacture and assemble. Also, they required a metal weight for a counterbalance for the trip mechanism.

Therefore, a primary object of the present invention is the provision of an improved mouse or rodent trap and method for assembling same.

A further object of the present invention is the provision of an improved trap made of plastic rather than metal.

A further object of the present invention is to provide an improved method for snapping together the parts of the trap for assembly.

A further object of the present invention is the provision of an improved trap which has a trigger mechanism constructed completely of plastic and which does not require a special metal weight for the counterbalance to the trip mechanism.

A further object of the present invention is the provision of an improved trap and method of assembling same which is economical, durable in use, and efficient in manufacture.

SUMMARY OF THE INVENTION

The foregoing objects may be achieved by a mouse or rodent trap comprising a housing having opposite ends and an entrance opening. An elongated paddle member is within the housing and includes a central axis and a plurality of paddles extending radially outwardly therefrom. The paddle member is rotatably mounted within the housing for rotation about its central axis. A spring yieldably urges the paddle member in a first rotational direction for causing one of the paddles to push a mouse or rodent entering the housing through the opening toward one of the opposite ends of the housing.

A trigger assembly is within the housing and includes a rotatable member having radially extending arms, a mouse or rodent actuated trip member, and a trip return member. The rotatable member is movable from a latched position wherein the radially extending arms engage the paddle member to prevent rotation thereof to an unlatched position permitting the rotatable member and the paddle member to rotate in response to the spring. The trip member is movable in response to engagement by a mouse or rodent from an untripped position engaging the rotatable member to prevent rotation thereof and a tripped position permitting the rotatable member to move to said unlatched position. A trip return member is movable from an inoperative position to an operative position in response to rotation of the paddle member wherein the trip return member engages the trip member and returns the trip member from its tripped position to its untripped position.

A spaced apart pair of side plates is positioned on opposite sides of the rotatable member, the trip member and the trip return member. All of the spaced apart side plates, the rotatable member, the trip member, and the trip return member are formed from plastic.

An additional feature of the present invention is the ability to snap the various pieces of the trigger assembly together.

One of the spaced apart side plates includes a plurality of shafts extending into engagement with the rotatable member, the trip member, the trip return member and the other of the spaced apart side plates. The other side plate includes snap holes therein. The shafts having snap tabs which extend through the snap holes and retentively engage the other side plate to hold the trigger assembly together.

Another feature of the present invention is that the trip member includes a counter weight formed completely from plastic rather than from metal as in prior devices.

The method of the present invention comprises forming the first side plate, the second side plate, the rotatable member, the trip member and the trip return member completely from plastic with the trip member having a counterbalance portion formed completely of plastic. The method further comprises inserting the first shaft through a hole in the rotatable member and a hole in the trip return member. The second shaft of the first side plate is inserted through a hole in the trip member. The snap tabs of the first second and third shafts are inserted into the snap receiving holes of the second side plate to retentively secure the first side plate to the second side plate with the rotatable member, the trip member and the trip return member positioned between the first and second side plates. The method further comprises mounting the rotatable paddle in the housing for rotation about a paddle axis. A spring is mounted between the housing and the rotatable paddle to cause the paddle to be urged in a first rotational direction. The trigger mechanism is then mounted within the housing with the rotatable member of the trigger mechanism in engagement with the rotatable paddle to prevent rotation thereof.

According to another feature of the present method the step of mounting the trigger mechanism to the housing comprises inserting snap tabs on the first and second side plates into snap receiving holes in the bottom wall of the housing.

BRIEF DESCRIPTION OF THE FIGURES OF THE DRAWINGS

FIG. 2 is an exploded perspective view of the trigger mechanism of the present invention.

FIG. 3 is a perspective view of the trigger mechanism in its assembled condition.

DETAILED DESCRIPTION OF THE PREFERRED EMBODIMENT

Figure 1:
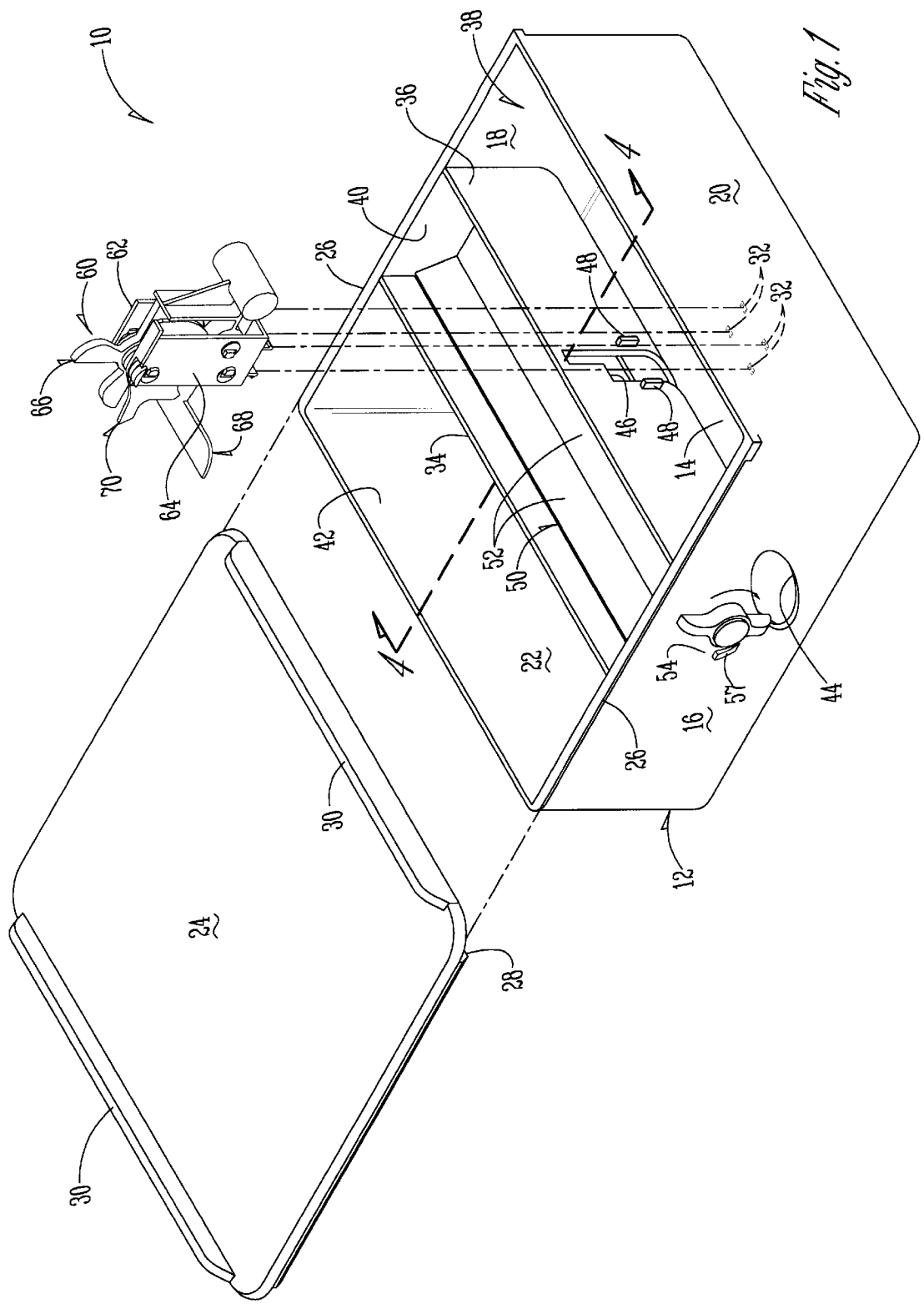
FIG. 1 is an exploded perspective view of the trap of the present invention.

Referring to the drawings the numeral 10 generally designates the mouse or rodent trap of the present invention. Trap 10 includes a housing 12 having a bottom wall 14, side walls 16, 18, and end walls 20, 22. The upper edges of side walls 16, 18 include side flanges 26 which are adapted to engage elongated slide tracks 28 on the opposite sides of top cover 24. Top cover 24 is also provided with handles 30 for facilitating the sliding movement of the top cover 24. Top cover 24 may be constructed of plastic and may be either opaque or transparent.

The bottom wall 14 of the housing 12 includes four snap receiving holes 32 for attachment of a trigger mechanism to be described in more detail hereafter. A housing 12 also includes a forward partition 34 and a rear partition 36 which together form a counterbalance compartment 38, a central compartment 40, and a trap compartment 42. Rear partition 36 includes a curved portion 39 (FIG. 4) adjacent its forward end and a mechanism slot 46 formed therein. Side wall 16 is provided with a hole 44 therein for permitting a mouse or rodent to enter the central compartment 40. The rear surface of partition 36 is provided with a pair of standoff stubs 48.

A paddle member 50 is mounted within the central compartment 40 for rotation about its longitudinal axis. Paddle member 50 includes a plurality of radially extending paddles 54. A spring 56 (FIG. 4) is mounted within a central opening 57 of paddle member 50. A handle 54 is connected to the spring 56 so as to permit the rotation of handle 54 to apply torsion to the spring 56. This causes the spring 56 to urge the paddle 50 in a clockwise direction as indicated by arrow 58 in FIG. 4. A wedge tooth 57 is formed on the outside surface of housing 12 and is adapted to permit handle 54 to rotate in a clockwise direction to increase the torsion in spring 56 while at the same time providing an anti back spin of handle 54 in a counterclockwise direction.

A trigger assembly 60 includes a first side plate 62, a second side plate 64, a rotatable member 66, a trip member 68, and a trip return member 70.

First side plate 62 includes a vertical plate 72 having a horizontal leg 74 at its lower end. First, second and third shafts 76, 78, 80 extend perpendicularly from the vertical plate 72 and each include a snap tab 82 having a lip 84 on its outer end. Snap tabs 82 are formed from plastic and are spring mounted so as to spring radially outwardly away from the shafts 76, 78, 80.

Rotatable member 66 includes a central hub 86 having a hub bore 88 extending therethrough. A plurality of radial arms 90 extend radially outwardly from the hub 86.

Trip return member 70 comprises a hub 92 having a hub bore 94 extending therethrough. A forward finger 96 extends forwardly from the trip return member and a lower finger 98 protrudes downwardly at the forward end of the trip return member 70. A rear cam surface 100 is at the rear of the trip return member 70 and an upper flange 110 is positioned adjacent the top edge of the return trip member 70.

Trip member 68 includes a hub 112 having a hub bore 114 extending therethrough. A trip shoulder 116 faces forwardly, and a lost motion hole 118 is also provided through the trip member 68 in a direction parallel to the hub bore 114. A trip pan 120 is provided adjacent the forward end of trip member 68 and a cam plate 122 extends vertically upwardly adjacent the rear end of the trip member 68. Plate 122 is held in position by a gusset 124, and a counterweight mass 126 is provided at the rear end of the trip member 68. Trip member 168 is constructed completely of plastic and the mass 126 is also plastic as contrasted with the use of a metal counterweight in prior devices.

Second side plate 64 includes an upstanding plate 128 having a horizontal leg 130 at its lower end. First, second and third snap holes 132, 134, 136 extend through the vertical upstanding plate 128. Extending downwardly from the horizontal leg 130 are two snap tabs 138, each of which includes a lip 140 at its lower end. Vertical plate 62 is also provided with similar snap tabs 138, 140, although those are not shown in the drawings.

The entire trigger assembly 60 is made completely of plastic and is adapted to snap together during construction. This is an improvement over prior devices which were constructed of metal and which required complicated assembly and manufacturing techniques.

To assemble the trigger assembly 60, the shaft 76 of plate 62 is extended through the bore 88 of rotatable member 66 and the bore 94 of the trip return member 70. Then first shaft 78 is fitted within the bore 114 of trip member 168 while at the same time the third shaft 80 is inserted through the lost motion hole 118 in the trip member 68. Finally the first, second and third shafts 76, 78, 80 are snapped into the first, second and third snap holes 132, 134, 136 respectively of second plate 64 1 1 so that the snap tabs 82 spring inwardly during insertion and spring outwardly with the lips 84 engaging the vertical plate 128 to retentively hold the trigger assembly 60 together.

The trigger assembly 60 is then attached to the bottom wall 14 of the housing 12 by inserting the snap tabs 138 into the snap receiving holes 32 so that the lips 140 retentively engage the bottom wall 14 and hold the trigger assembly 60 in place.1

Figure 4:
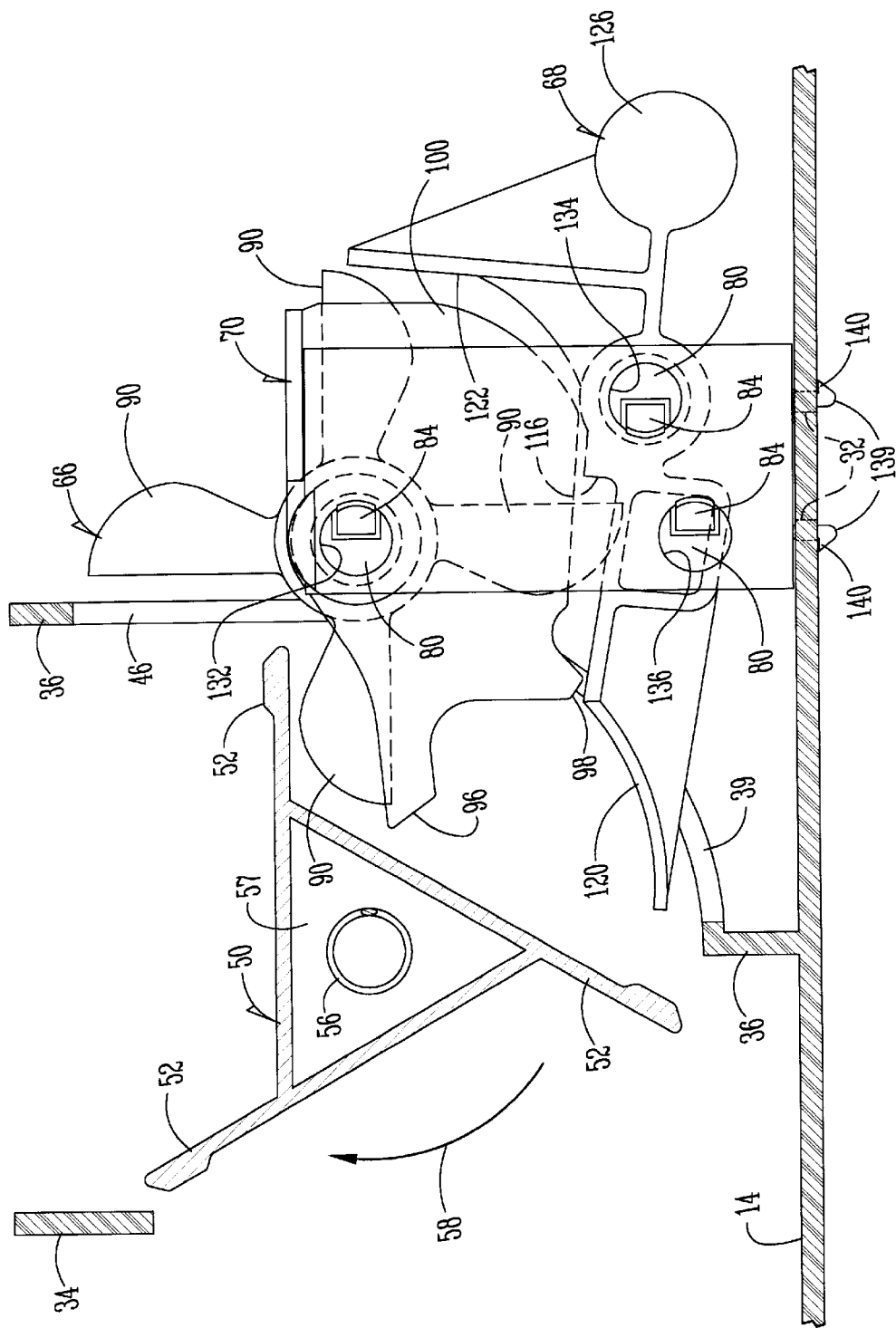
FIG. 4 is a sectional view taken along line 44 of FIG. 1.

The assembled unit can be seen in FIG. 4. In this position one of the arms 90 of rotatable member 66 engage the shoulder 116 of trip member 68. The paddle 52 of paddle member 50 is yieldably urged by spring 56 in a counterclockwise direction, and engages one of the arms 90 of rotatable member 66 so as to urge rotatable member 66 in a counterclockwise direction. This causes the lower most arm 90 to engage the shoulder 116 and prevent rotation of either the paddle member 50 or the rotatable member 66.

When a rodent such as a mouse enters opening 44 and engages the trip pan 120 of trip member 68, it causes the trip member to rotate in a counterclockwise direction to lower the shoulder 116 and to raise the counterweight 126. The lowering of shoulder 116 releases the rotatable member 66 so that it can rotate in a counterclockwise direction, and this permits the paddle member 50 to rotate in a clockwise direction in response to the spring 56. This causes the paddles 52 to push the mouse or rodent from the central chamber 40 into the trap chamber 42.

The rotation of the paddles 52 also causes the paddles 52 to engage the forward finger 96 of trip return member 70 thereby causing it to rotate in a counterclockwise direction. This brings cam surface 100 into contact with cam plate 122 and urges the cam plate 122 in a clockwise direction back to its untripped position. In this untripped position, trip shoulder 116 is again in a position to engage one of the arms 90 and prevent rotation of both the rotatable member 66 and the paddle member 50.

The extension of the third shaft 80 through the lost motion hole 118 permits limited pivotal movement of the trip member 68 between its tripped and untripped position.

In the drawings and specification there has been set forth a preferred embodiment of the invention, and although specific terms are employed, these are used in a generic and descriptive sense only and not for purposes of limitation. changes in the form and the proportion of parts as well as in the substitution of equivalents are contemplated as circumstances may suggest or render expedient without departing from the spirit or scope of the invention as further defined in the following claims.

What is claimed is:

1. A mouse or rodent trap comprising:

a housing having opposite ends and an entrance opening;

an elongated paddle member within said housing having a central axis and a plurality of paddles extending radially outwardly therefrom, said paddle member being rotatably mounted within said housing for rotation about said central axis;

a spring yieldably urging said paddle member in a first rotational direction for causing one of said paddles to push said mouse or rodent entering said housing through said opening toward one of said opposite ends of said housing;

a trigger assembly comprising a rotatable member having radially extending arms, an actuatable trip member, and a trip return member;

said rotatable member being movable from a latched position wherein said radially extending arms engage said paddle member to prevent rotation thereof to an unlatched position permitting said rotatable member to rotate in response to said spring;

said trip member being movable in response to engagement by said mouse or rodent from an untripped position engaging said rotatable member to prevent rotation thereof, and a tripped position permitting said rotatable member to move to said unlatched position;

said trip return member being movable from an inoperative position to an operative position in response to rotation of said paddle member wherein said trip return member engages said trip member and returns said trip member from said tripped position to said untripped position;

a spaced apart pair of side plates positioned on opposite sides of said rotatable member, said trip member, and said trip return member;

said spaced apart side plates, said rotatable member, said trip member, and said trip return member being formed completely from plastic;

one of said spaced apart side plates comprising a plurality of shafts extending into engagement with said rotatable member, said trip member, said trip return member, and the other of said spaced apart side plates; said other of said side plates having snap holes therein, said shafts having snap tabs therein which extend through said snap holes and retentively engage said other side plate to hold said trigger assembly together.

2. The mouse or rodent trap of claim 1 wherein said trip member is rotatably mounted to said trigger assembly for rotation about a trip axis from said untripped position to said tripped position, said trip member being made completely from plastic and having a plastic counterweight yieldably urging said trip member to said untripped position.

3. The mouse or rodent trap of claim 1 wherein said pair of side plates comprises a first side plate and a second side plate, said first side plate made completely of plastic and having first, second, and third shafts extending therefrom, each of said first, second, and third shafts having a distal end with a snap tab integrally formed thereon, said rotatable member, said trip member, and said trip return member each have a shaft receiving hole therein, said first shaft extending though said shaft receiving holes of said rotatable member and said trip return member, said second shaft extending through said shaft receiving hole of said trip member, and said third shaft engaging said trip member to limit the range of movement of said trip member between said tripped and said untripped positions, said second side plate having first, second, and third snap receiving holes therein, said snap tabs of said first, second, and third shafts being snapped within said first, second, and third snap receiving holes to retentively hold said trigger assembly together.

4. The mouse or rodent trap according to claim 3 wherein each of said first and second side plates have lower edges, at least two snap tabs being formed on said lower edges of said first and second side plates, said housing having a bottom wall with a plurality of snap receiving holes formed therein, said snap tabs of said first and second side plates each being snapped within one of said snap receiving holes in said bottom wall to attach said trigger assembly to said bottom wall.

5. A method for assembling a mouse or rodent trap comprising a housing having a plurality of walls forming a compartment, one of said walls having a mouse or rodent hole therein, a trigger mechanism and a rotatable paddle being within said compartment, said trigger mechanism comprising a first side plate and a second side plate spaced apart from one another and embracing a rotatable member, a trip member, and a trip return member therebetween, said first side plate having three shafts extending therefrom, each with a snap tab thereon, said second side plate having three snap receiving holes therein, said method comprising:

forming said first side plate, said second side plate, said rotatable member, said trip member, and said trip return member completely from plastic with said trip member having a counter balance portion formed completely of plastic;

inserting said first shaft through a hole in said rotatable member and a hole in said trip return member;

inserting said second shaft through a hole in said trip member;

inserting said snap tabs of said first, second, and third shafts into said first, second, and third snap receiving holes of said second side plate to retentively secure said first side plate to said second side plate, with said rotatable member, said trip member, and said trip return member positioned between said first and second side plates;

mounting said rotatable paddle in said housing for rotation about a paddle axis;

mounting a spring between said housing and said rotatable paddle to cause said paddle to be urged in a first rotational direction;

mounting said trigger mechanism within said housing with said rotatable member of said trigger mechanism in engagement with said rotatable paddle to prevent rotation thereof.

6. The method according to claim 5 wherein said step of mounting said trigger mechanism to said housing comprises inserting snap tabs on said first and second side plates into snap receiving holes in a bottom wall of said housing.

7. A mouse or rodent trap comprising:

a housing having opposite ends and an entrance opening;

an elongated paddle member within said housing having a central axis and a plurality of paddles extending radially outwardly therefrom, said paddle member being rotatably mounted within said housing for rotation about said central axis;

a spring yieldably urging said paddle member in a first rotational direction for causing one of said paddles to push said mouse or rodent entering said housing through said opening toward one of said opposite ends of said housing;

a trigger assembly comprising a rotatable member having radially extending arms, an actuatable trip member, and a trip return member;

said rotatable member being movable from a latched position wherein said radially extending arms engage said paddle member to prevent rotation thereof to an unlatched position permitting said rotatable member to rotate in response to said spring;

said trip member being movable in response to engagement by said mouse or rodent from an untripped position engaging said rotatable member to prevent rotation thereof, to a tripped position permitting said rotatable member to move to said unlatched position;

said trip return member being movable from an inoperative position to an operative position in response to rotation of said paddle member wherein said trip return member engages said trip member and returns said trip member from said tripped position to said untripped position;

a first side plate positioned on one side of said trigger assembly and a second side plate having one or more snap receptacles and being positioned on the opposite side of said trigger assembly;

one or more elongated members connected to said first side plate and having snap portions retentively engaging said snap receptacles of said second side plate to hold said trigger assembly together.

8. A mouse or rodent trap according to claim 7 wherein at least one of said one or more elongated members engages each of said rotatable member, said trip member, and said trip return member.

* * * * *